UNITED STATES PATENT OFFICE.

PETER BERGELL AND FRITZ MEYER, OF BERLIN, GERMANY.

PROCESS FOR OBTAINING SOLUTIONS OF BACTERIAL POISONS.

No. 842,612.  Specification of Letters Patent.  Patented Jan. 29, 1907.

Application filed September 13, 1906. Serial No. 334,386.

*To all whom it may concern:*

Be it known that we, PETER BERGELL and FRITZ MEYER, subjects of the Emperor of Germany, and residents of Berlin, Germany, have invented certain new and useful Improvements in Processes for Obtaining Solutions of Bacterial Poisons, of which the following is a specification.

With the known processes it has heretofore not been possible to obtain from the most kinds of bacteria aqueous solutions containing their specific toxin and being at the same time suitable for immunifying purposes. While in the diphtheria-toxin we have a poison which may at least in quantity be employed for immunifying purposes, such does not exist of other bacteria, as of the strepto-coccus, typhoid bacillus. The isolated solid toxines, too, known at present as "diphtheria" and "tetanus" toxin, are known to contain several poisons of albuminous and albumose nature.

According to experiments made by us for obtaining these products which are so very sensitive with regard to the ordinary temperature and reagents, reactions may be employed in which anhydrous substances are employed at very low temperatures. By this method the bodies of bacteria, of which by the known processes no sufficiently effective solutions could be obtained, undergo decomposition to such an extent that they split off their specific poisons, which are taken up by the physiological solution of chlorid of sodium, and other poisons are decomposed so far that a part of the noxiously injurious poisons which prevent immunization and endanger the life of the animals serving for the production of the serum is decomposed, while their immunizing capacity is preserved. We observe that the treatment with anhydrous liquid hydrochloric acid, which, as known, boils at about 86° centigrade, affords a process to obtain the desired solutions. The process may be considered besides a simple decomposition as a partial conversion of albumen, as liquid hydrochloric acid is used for splitting up albuminates into albuminous substances of less complicated chemical constitution.

Example 1: A highly virulent streptococcus culture is separated in the centrifuge with a physiological solution of chlorid of sodium and then dried in a vacuum. Over the dried and ground substance dry gases of hydrochloric acid are conducted which are cooled by means of liquid air. After the acid has had time to act it is allowed to evaporate, care being taken that the process proceeds in the absence of water. Now the substance is mixed with physiological solution of chlorid of sodium and separated by centrifuges and filtered off by Berckefeld filters. The operations must be carried out under strict sterilization. The solutions produce on various kinds of animals intravenous and introperitoneal intoxications, which are analogous to strepto-coccus infections, but occur only more rapidly, proceed quantitatively, and show an absence of bacteria. An immunifying liquid is produced.

Example 2: Of four equally strong white mice on November 10, 1905, mouse No. 1 received a subcutaneous injection of one and one-tenth doses of live typhoid bacilli, a dose being a drop taken out by means of a platinum loop such as are commonly used in bacteriology a one-tenth part of such a drop is obtained by diluting one drop to ten times its volume and taking another drop with the platinum loop of the diluted culture; mouse No. 2, 0.2 cubic centimeters of a filtrated bouillon culture of typhoid; mouse No. 3, 0.2 of a plain extraction of dry typhoid bacilli; mouse No. 4, 0.2 cubic centimeters of a solution obtained according to the above-described process from an equal quantity of bacilli. Mouse No. 5 and No. 6 serve as controlling animals. On November 18 mice No. 1–6 are infected with 0.1 cubic centimeters of a virulent typhoid bouillon. On November 19 mice No. 1, 2, 3, 5, 6 are dead, while mouse No. 4 is still alive. The experiment corresponds with the above explanations.

Having now described our invention, what we claim, and desire to secure by Letters Patent of the United States, is—

1. The process of producing solutions of bacteria poisons adapted for immunization consisting in treating dry bacteria poisons with anhydrous liquid hydrochloric acid, evaporating the acid and extracting the product.

2. The process of producing aqueous solutions of bacteria poisons containing the specific toxin and adapted for immunization consisting in treating dry bacteria poisons with anhydrous liquid hydrochloric acid, evaporating the acid, and extracting the product.

Signed at Berlin, Germany, this 31st day of August, 1906.

PETER BERGELL.
FRITZ MEYER.

Witnesses:
  HENRY HASPER,
  WOLDEMAR HAUPT.